United States Patent [19]

Baumann et al.

[11] 4,119,622

[45] Oct. 10, 1978

[54] PYRAZOLONYLAZOANILINE OR AMINONAPHTYL COMPOUNDS FOR COPYING PROCESSES

[75] Inventors: Hans Baumann, Wachenheim; Andreas Oberlinner, Ludwigshafen, both of Fed. Rep. of Germany

[73] Assignee: BASF Aktiengesellschaft, Ludwigshafen, Fed. Rep. of Germany

[21] Appl. No.: 737,720

[22] Filed: Nov. 1, 1976

[30] Foreign Application Priority Data

Dec. 20, 1975 [DE] Fed. Rep. of Germany ....... 2557686

[51] Int. Cl.² ..................... C09B 29/06; C09B 29/08
[52] U.S. Cl. .................... 260/162; 260/156; 260/163; 427/146; 428/323
[58] Field of Search ........... 260/162, 163; 427/146; 428/323

[56] References Cited

U.S. PATENT DOCUMENTS

| | | | |
|---|---|---|---|
| 2,391,180 | 12/1945 | McNally et al. | 260/163 |
| 3,124,567 | 3/1964 | Forter et al. | 260/163 |
| 3,223,527 | 12/1965 | Dreyfuss | 260/163 X |
| 3,697,501 | 10/1972 | Dehnert | 260/163 |
| 3,751,405 | 8/1973 | Angliker et al. | 260/158 |
| 3,948,878 | 4/1976 | Coispeau | 260/147 |
| 3,955,088 | 11/1976 | Garner et al. | 428/323 |

FOREIGN PATENT DOCUMENTS

1,086,994 10/1967 United Kingdom .................... 260/162

*Primary Examiner*—Floyd D. Higel
*Attorney, Agent, or Firm*—Keil, Thompson & Shurtleff

[57] ABSTRACT

An azo compound useful in copying processes of the formula

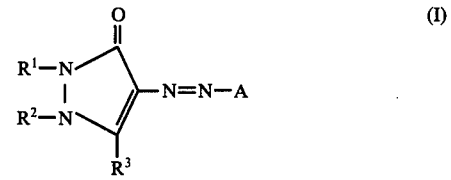

where $R^1$ is hydrogen or alkyl of 1 to 4 carbon atoms, $R^2$ and $R^3$ are each alkyl of 1 to 4 carbon atoms, or one of the radicals $R^1$, $R^2$ and $R^3$ is unsubstituted phenyl or phenyl substituted by alkyl of 1 to 4 carbon atoms, methoxy or ethoxy, and A denotes

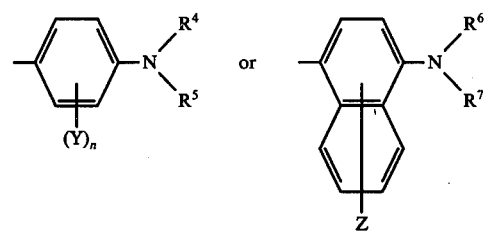

where $R^4$ and $R^5$ are each hydrogen; alkyl of 1 to 8 carbon atoms which may be substituted by hydroxy, alkoxy, halogen or alkoxycarbonyl; cyanoethyl; alkylcarbonyl with 1 to 3 carbon atoms in the alkyl; cyclohexyl; phenalkyl of 7 to 10 carbon atoms; or substituted or unsubstituted phenyl, or $R^4$ is N,N-dialkylaminoalkyl or N,N-bisphenalkylaminoalkyl, or the group

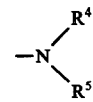

is a 5-membered or 6-membered saturated heterocyclic ring which may contain an —O— or —S— group as ring member, Y is hydroxy, alkyl, alkoxy, chlorine, bromine or alkylcarbonylamino, n is 0, 1 or 2, $R^6$ and $R^7$ are each hydrogen, alkyl of 1 to 4 carbon atoms, cyclohexyl or unsubstituted phenyl or phenyl substituted by alkyl or alkoxy, and Z is hydrogen, hydroxy, methoxy, ethoxy or a sulfonic acid group. The light absorption of the yellow to orange colored compounds (I) is displaced, upon protonation of the compounds, by 150 to 200 nm toward the longer wavelength range, i.e. the salts are violet to blue in color.

The compounds (I) are suitable for the production of pressure-sensitive n.c.r. papers.

10 Claims, No Drawings

PYRAZOLONYLAZOANILINE OR AMINONAPHTYL COMPOUNDS FOR COPYING PROCESSES

The present invention relates to new azo compounds of the formula(I):

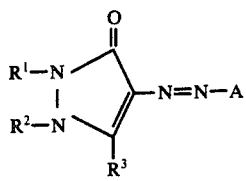

where
$R^1$ is hydrogen or alkyl of 1 to 4 carbon atoms,
$R^2$ and $R^3$ are identical or different alkyl of 1 to 4 carbon atoms, or one of the radicals $R^1$, $R^2$ and $R^3$ is unsubstituted phenyl or phenyl substituted by alkyl of 1 to 4 carbon atoms, methoxy or ethoxy, and A denotes

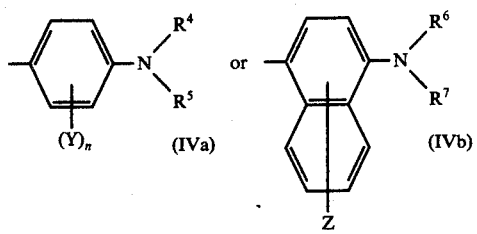

where $R^4$ and $R^5$ are each hydrogen; alkyl of 1 to 8 carbon atoms; hydroxyalkyl of 2 or 3 carbon atoms; alkoxyalkyl of 3 to 8 carbon atoms; haloalkyl of 2 to 8 carbon atoms; cyanoethyl; alkylcarbonyloxyalkyl of a total of 4 to 10 carbon atoms; alkylcarbonyl with 1 to 3 carbon atoms in the alkyl; cyclohexyl; phenalkyl of 7 to 10 carbon atoms; or unsubstituted phenyl or phenyl substituted by alkyl of 1 to 4 carbon atoms, methoxy or ethoxy, the substituents being identical or different, or
$R^4$ is N,N-dialkylaminoalkyl of a total of 4 to 11 carbon atoms or N,N-bisphenylalkylaminoalkyl having 7 to 10 carbon atoms per phenylalkyl and 2 or 3 carbon atoms in the aminoalkyl, or the group

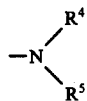

is a 5-membered or 6-membered saturated heterocyclic ring which may contain an —O— or —S— group as ring member, and Y is hydroxy, alkyl of 1 to 4 carbon atoms, alkoxy of 1 to 4 carbon atoms, chlorine, bromine or alkylcarbonylamino of a total of 2 to 4 carbon atoms, n is 0, 1 or 2,
$R^6$ and $R^7$ are each hydrogen, alkyl of 1 to 4 carbon atoms, cyclohexyl or unsubstituted phenyl or phenyl substituted by alkyl of 1 to 4 carbon atoms or alkoxy of 1 to 4 carbon atoms, and
Z' is hydrogen, hydroxy, methoxy, ethoxy or a sulfonic acid group.
The following are specific examples of the substituents $R^1$, $R^2$ and $R^3$:
alkyl of 1 to 4 carbon atoms or substituted or unsubstituted phenyl: methyl, ethyl, propyl, butyl, phenyl, tolyl, ethylphenyl, butylphenyl, methoxyphenyl and ethoxyphenyl.
$R^1$ is preferably o- or p-tolyl, p-methoxyphenyl, p-ethoxyphenyl and in particular phenyl.
$R^2$ and $R^3$ are preferably methyl or ethyl, the substituents being identical or different.
Further specific examples of the substituents $R^4$ and $R^5$ which may be identical or different are as follows:
alkyl of 1 to 8 carbon atoms and haloalkyl: methyl, ethyl, propyl, butyl, pentyl, hexyl, octyl, 2-ethylhexyl and chlorohexyl; alkoxyalkyl and hydroxyalkyl: β-hydroxyethyl, β-hydroxypropyl, γ-hydroxypropyl, β-methoxyethyl, β-ethoxyethyl, β-butoxyethyl, γ-methoxypropyl, γ-ethoxypropyl and γ-butoxypropyl; alkylcarbonyloxyalkyl: β-acetoxyethyl, β-propionoxyethyl, β-butyroxyethyl, γ-acetoxypropyl and γ-propionoxypropyl; phenalkyl and substituted or unsubstituted phenyl: phenyl, tolyl, methoxyphenyl, ethoxyphenyl, benzyl, β-phenylethyl, γ-phenylpropyl, β-phenylpropyl and γ-phenylbutyl; alkylcarbonyl: acetyl, propionyl and butyryl.
One of the substituents $R^4$ and $R^5$ may also be N',N'-dimethylaminoethyl, N',N'-diethylaminoethyl, N',N'-dibutylaminoethyl, N',N'-dimethylaminopropyl, N',N'-diethylaminopropyl, N',N'-dibutylaminopropyl or N',N'-bisbenzylaminoethyl, the amino groups being in the β- or γ-position.

as the radical of a heterocyclic ring, is for example the radical of piperidine, morpholine, thiomorpholine and pyrrolidine. $R^4$ and $R^5$ are preferably β-hydroxyethyl, β-acetoxyethyl, β-cyanoethyl and in particular methyl, ethyl or butyl, or $R^4$ is acetyl, $-C_2H_4-N(CH_3)_2$, $-C_2H_4-N(CH_2-C_6H_5)_2$, benzyl, phenyl, p-tolyl, or p-ethoxyphenyl and $R^5$ is hydrogen, methyl or ethyl;
Y is preferably hydroxy, chlorine, bromine or acetylamino and in particular methyl, methoxy, or ethoxy, n being 2, preferably 0 to 1.
$R^6$ is preferably hydrogen or methyl, and $R^7$ is preferably hydrogen, cyclohexyl, p-tolyl, phenyl or p-ethoxyphenyl.
Z is preferably hydroxy, methoxy, ethoxy or a sulfonic acid group (i.e. hydroxysulfonyl of the formula $-SO_3H$) and in particular hydrogen.
The radical of the formula (IVa) is particularly preferred for A.
The absorption of the yellow to orange colored azo compounds of the formula (I) is displaced toward longer wavelengths by 150 to 200 nm when the compounds are brought into contact with electron acceptors in an inert organic solvent, i.e. the compounds turn violet to blue. Typical examples of electron acceptors are carboxylic or mineral acids, kaolin, bentonite, activated clay, aluminum silicate, attapulgite, any kind of acid clay, acid-reacting polymeric materials such as the condensation products of phenols and/or phenolsulfonic acids, and metal oxides or salts such as zinc oxide, aluminum oxide, iron stearate and cobalt naphthenate.
On account of the above property the new compounds of the formula (I) can be used as chromogenic materials (dye precursors) in pressure-sensitive copying materials or other duplicating systems.

Preferably the compounds according to the present invention in the form of a solution or suspension in organic solvents, such as chloroparaffins, halogenated or partially hydrogenated biphenyl, alkylbenzene, alkylnaphthalene, alkylated dibenzylbenzene, paraffin oil, mineral oil or in a commonly used solvent, such as toluene and xylene, are encapsulated in microcapsules and used in this form for the production of pressure-sensitive papers for copying processes. For this purpose the microcapsules in the form of a dispersion together with a binder and, if desired, other auxiliaries are applied to paper.

Azo compounds of the formula (Ia) are of particular interest as dye precursors for pressure-sensitive copying materials:

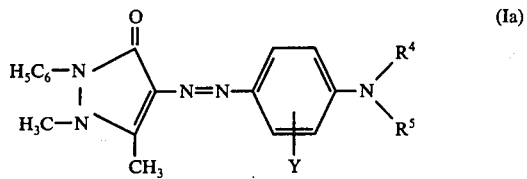

where $R^4$, $R^5$ and Z have the above meanings.

For technical and tinctorial reasons the compounds having the following formulae are particularly preferred as dye precursors:

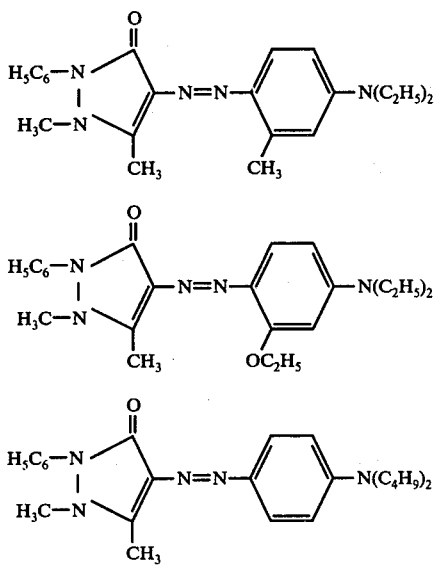

The azo compounds of the formula (I) can be prepared in a conventional manner by diazotization of the appropriately substituted aminopyrazolone of the formula (II) (diazo component) and coupling with an appropriately substituted aniline or naphthylamine of the formula (IIIa) or (IIIb) (coupling component):

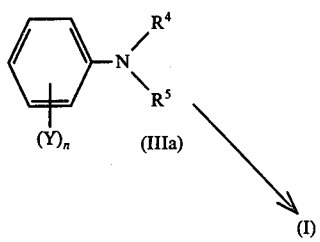

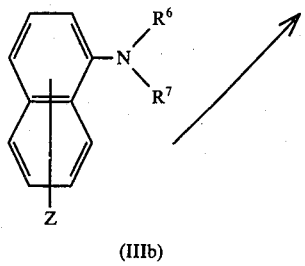

The products of the present invention have the advantage over comparable compounds of similar structure that, upon protonation thereof, the absorption maximum is displaced much further toward the longer wavelength range.

Specific examples of suitable aminopyrazolones are:

1-phenyl-2,3-dimethyl-4-aminopyrazolone-(5) (=4-aminoantipyrine),
1-p-tolyl-2,3-dimethyl-4-aminopyrazolone-(5),
1-p-ethoxyphenyl-2,3-dimethyl-4-aminopyrazolone-(5),
1-o-tolyl-2-ethyl-3-methyl-4-aminopyrazolone-(5),
1-p-tolyol-4-amino-5-methyl-pyrazolone-(3),
1,2-dimethyl-3-phenyl-4-aminopyrazolone-(5), and
1,2-dimethyl-3-p-tolyl-4-aminopyrazolone-(5).

Specific examples of coupling components are: aniline, N-methylaniline, N,N-dimethylaniline, N-ethylaniline, N,N-diethylaniline, N,N-dibutylaniline, N-methyl-N-($\beta$-hydroxyethyl)-aniline, N-ethyl-N-($\beta$-hydroxyethyl)-aniline, N-butyl-N-($\beta$-hydroxyethyl)-aniline, N-chlorohexyl-N-butylaniline, N-($\beta$-acetoxyethyl)-N-ethylaniline, N-(butyroxyethyl)-N-ethylaniline, N-($\beta$-2'-ethylhexanoyloxyethyl)-N-ethylaniline, N-($\beta$-acetoxyethyl)-N-$\beta$-cyanoethylaniline, N,N-di($\beta$-cyanoethyl)-aniline, m-chloroaniline, m-bromoaniline, acetanilide, N-phenylmorpholine, N-phenylpiperidine, N-phenylpyrrolidine, m-amino-p-methoxyacetanilide, N-(p-ethoxyphenyl)-N-methylaniline, N-methyl-N-benzylaniline, N-ethyl-N-benzylaniline, 2,5-dimethoxyacetanilide, m-(N,N-dimethylamino)-acetanilide, N,N-dimethyl-o-toluidine, N-methyl-o-toluidine, N-ethyl-o-toluidine, o-toluidine, m-toluidine, N-methyl-m-toluidine, N,N-dimethyl-m-toluidine, N-ethyl-m-toluidine, N,N-diethyl-m-toluidine, N-butyl-m-toluidine, N-($\beta$-hydroxyethyl)-o-toluidine, N-($\beta$-hydroxyethyl)-m-toluidine, N-methyl-N-($\beta$-hydroxyethyl)-m-toluidine, N-ethyl-N-($\beta$-hydroxyethyl)-m-toluidine, N,N-dimethylanisidine, N,N-diethylanisidine, m-[N-ethyl-N-($\beta$-hydroxyethyl)]-anisidine, m-ethoxy-N,N-dimethylaniline, m-ethoxy-N,N-diethylaniline, m-N,N-dimethylaminophenol, m-N,N-diethylaminophenol, diphenylamine, N-methyldiphenylamine, N,N,N'-trimethyl-N'-phenylethylenediamine, N-phenyl-N-ethyl-N',N'-dibenzylethylenediamine, N-methyl-N-phenyl-$\alpha$-naphthylamine, N-phenyl-$\alpha$-naphthylamine, N-cyclohexyl-$\alpha$-naphthylamine, 1-(p-tolylamino)-naphthalene-8-sulfonic acid, N-(p-ethoxyphenyl)-$\alpha$-naphthylamine and 1-amino-6-naphthol.

The production and isolation of the new compounds having the formula (I) is further illustrated by the following Examples in which parts are by weight.

EXAMPLE 1

A solution of 20 parts of 4-aminoantipyrine in 28 parts of concentrated hydrochloric acid and 100 parts of water is cooled to 5° C. and then has a solution of 28 parts of sodium nitrite in 100 parts of water added to it. This mixture is stirred for 30 minutes. The resulting diazo solution is then introduced into a solution of 18 parts of diethyl-m-toluidine in 30 parts of concentrated hydrochloric acid and 100 parts of water and the mixture is stirred for a further 15 minutes. The pH value of the suspension is adjusted to 6 by the addition of saturated sodium acetate solution. Stirring is continued for 2 hours and the precipitated dye is isolated by suction filtration. Yield: 33 parts of the compound of the formula:

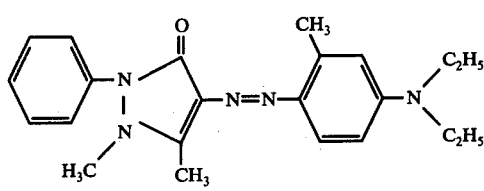

having a melting point of 170° to 171° C.

The absorption maximum of the azo dye (=base) is at 410 nm and that of the protonated compound at 610 nm.

EXAMPLE 2

20 parts of 4-aminoantipyrine is diazotized in the manner described in Example 1 and the resulting diazo solution is introduced into a solution of 21 parts of dibutylaniline in 500 parts of acetone and 100 parts of water. The pH is adjusted to 6 by the addition of saturated sodium acetate solution and stirring is continued for 12 hours. The dye obtained in the form of an oil is caused to crystallize by boiling in cyclohexane. Yield: 11 parts of dye having a melting point of 127° to 128°.

The free base absorbs at 411 and 440 nm and the protonated compound at 605 nm.

EXAMPLE 3

20 parts of 4-aminoantipyrine is diazotized in the manner described in Example 1 and the resulting diazo solution is introduced into a solution of 19 parts of m-ethoxy-N,N-diethylaniline in 30 parts of concentrated hydrochloric acid, 200 parts of water and 400 parts of acetone. The pH is adjusted to 6 by the addition of saturated sodium acetate solution. Stirring is continued for 12 hours and the dye is isolated by suction filtration. Yield: 34 parts of dye having a melting point of 155° to 156° C.

The absorption maxima of the free base are at 421 and 447 nm; the protonated compound absorbs at 607 nm.

EXAMPLE 4

20 parts of 4-aminoantipyrine is diazotized in the manner described in Example 1. The resulting diazo solution is introduced into a solution of 15 parts of N,N-dimethylaniline in 30 parts of concentrated hydrochloric acid and 50 parts of water. The further procedure is as described in Example 1, and 32 parts of dye having a melting point of 204° to 207° C. is obtained.

The absorption maximum of the free base is at 397 nm and that of the protonated compound at 583 nm.

Dye precursors of the formula:

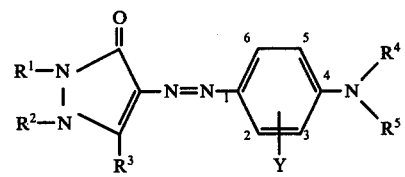

are obtained in a manner analogous to that described in Examples 1 to 4. The meanings of the substituents $R^1$, $R^2$, $R^3$, $R^4$, $R^5$ and Y are given in the following Table.

| Example | $R^1$ | $R^2$ | $R^3$ | $R^4$ | $R^5$ | y | Color of the protonated compound |
|---|---|---|---|---|---|---|---|
| 5  | $C_6H_5$ | $CH_3$ | $CH_3$ | $CH_3$ | $CH_2C_6H_5$ | — | blue |
| 6  | $C_6H_5$ | " | " | $C_2H_5$ | $CH_2C_6H_5$ | — | blue |
| 7  | " | " | " | " | $C_2H_4N(CH_3)_2$ | — | bluish violet |
| 8  | " | " | " | H | H | 2-$CH_3$ | violet |
| 9  | " | " | " | $CH_3$ | $CH_3$ | " | blue |
| 10 | " | " | " | " | " | 3-$CH_3$ | " |
| 11 | " | " | " | " | $C_2H_4OH$ | — | " |
| 12 | p-$CH_3$—$C_6$—$H_4$ | " | " | " | $CH_2C_6H_5$ | — | " |
| 13 | $C_6H_5$ | $C_2H_5$ | " | $C_2H_5$ | $C_2H_5$ | 2-$CH_3$ | " |
| 14 | p-$C_2H_5OC_6H_4$ | " | " | " | " | 2-$OC_2H_5$ | " |
| 15 | $CH_3$ | $CH_3$ | $C_6H_5$ | $C_6H_5$ | " | 2-$CH_3$ | bluish violet |
| 16 | H | p-$CH_3C_6H_4$ | $CH_3$ | $CH_3$ | $CH_3$ | — | bluish violet |
| 17 | O-$CH_3$—$C_6H_4$ | $CH_3$ | " | $CH_3$ | " | 2-$OCH_3$ | blue |
| 18 | $C_6H_5$ | " | " | $C_2H_5$ | $C_2H_4OH$ | 2-$CH_3$ | " |
| 19 | " | " | $C_2H_5$ | " | $C_2H_5$ | 2-$OCH_3$ | " |
| 20 | " | $C_2H_5$ | $CH_3$ | " | $C_2H_4OCOCH_3$ | — | " |
| 21 | " | $CH_3$ | $CH_3$ | $C_2H_4CN$ | " | — | " |
| 22 | $C_6H_5$ | $CH_3$ | " | $C_2H_4CN$ | $C_2H_4CN$ | — | blue |
| 23 | " | " | " | —$(CH_2)_4$— | | — | " |
| 24 | " | $C_2H_5$ | " | —$(CH_2)_5$— | | — | " |
| 25 | " | $CH_3$ | " | —$(CH_2)_2O(CH_2)_2$— | | — | violet |
| 26 | " | " | " | H | H | 2-Cl | reddish violet |
| 27 | " | " | " | H | H | 2-Br | " |
| 28 | " | " | " | H | $COCH_3$ | — | bluish violet |
| 29 | " | " | " | $CH_3$ | —$C_2H_4OC_6H_4$ | — | blue |
| 30 | " | " | " | $C_2H_5$ | $C_2H_4N(CH_2C_6H_5)_2$ | — | " |
| 31 | " | " | " | " | —$C_2H_5$ | 2-NHCOCH$_3$ | " |
| 32 | " | " | " | H | —$COCH_3$ | 2-$OCH_3$; 5-$OCH_3$; | bluish violet |
| 33 | " | " | " | $CH_3$ | $CH_3$ | 2-OH | " | y — = n = 0, i.e. S" = hydrogen

EXAMPLE 34

20 parts of 4-aminoantipyrine is diazotized in the manner described in Example 1 and the resulting diazo solution is introduced into a solution of 16 parts of 1-amino-6-naphthol in 150 parts of acetone and 50 parts of concentrated hydrochloric acid. 250 parts of saturated sodium acetate solution is then added and stirring is effected for 12 hours at room temperatures. Yield: 34 parts of dye having a melting point of 175° to 177° C.

The absorption maximum of the compound is at 461 nm; the protonated compound absorbs at 595 and 631 nm.

Dye precursors of the formula:

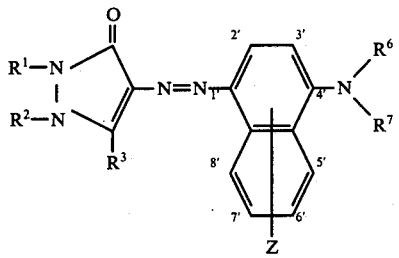

are produced in a manner analogous to that described in Example 34. The meanings of $R^1$, $R^2$, $R^3$, $R^6$, $R^7$ and Z are given in the following Table.

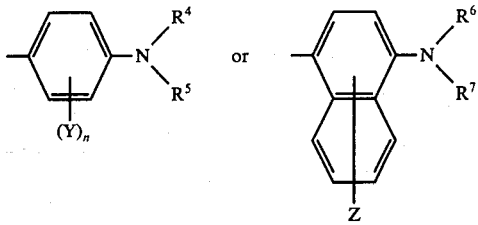

where $R^4$ and $R^5$ are each hydrogen; alkyl of 1 to 8 carbon atoms; hydroxyalkyl of 2 or 3 carbon atoms; alkoxyalkyl of 3 to 8 carbon atoms; cyanoethyl; alkylcarbonyloxyalkyl of a total of 4 to 10 carbon atoms; alkylcarbonyl with 1 to 3 carbon atoms in the alkyl; cyclohexyl; phenalkyl of 7 to 10 carbon atoms; or unsubstituted phenyl or phenyl substituted by alkyl of 1 to 4 carbon atoms, methoxy or ethoxy; or $R^4$ is N, N-dialkylaminoalkyl of a total of 4 to 11 carbon atoms of N, N-bis-phenylalkylaminoalkyl having 7 to 10 carbon atoms per phenylalkyl and 2 or 3 carbon atoms in the aminoalkyl; or the group

| Example | $R^1$ | $R^2$ | $R^3$ | $R^6$ | $R^7$ | Z | Color of the protonated compound |
|---|---|---|---|---|---|---|---|
| 35 | $C_6H_5$ | $CH_3$ | $CH_3$ | H | p-$C_6H_4$—$CH_3$ | 5'-$SO_3H$ | bluish green |
| 36 | " | " | " | H | —⟨H⟩ | H | blue |
| 37 | " | $C_2H_5$ | " | $CH_3$ | —$C_6H_5$ | H | bluish violet |
| 38 | p-$C_2H_5O$—$C_6H_4$ | " | " | H | —⟨H⟩ | H | blue |
| 39 | O—$CH_3$—$C_6H_4$ | $CH_3$ | " | $CH_3$ | —$C_6H_5$ | H | bluish violet |
| 40 | $CH_3$ | " | $C_6H_5$ | " | " | H | bluish violet |
| 41 | $C_6H_5$ | " | $CH_3$ | H | p-$C_2H_5O$—$C_6H_4$— | H | blue |
| 42 | " | " | " | H | H | 3'-$OC_2H_5$ | blue |
| 43 | " | " | " | $CH_3$ | —$C_6H_5$ | H | bluish violet |

We claim:

1. An azo compound of the formula:

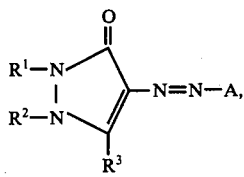

where
$R^1$ is hydrogen or alkyl of 1 to 4 carbon atoms,
$R^2$ and $R^3$ are each alkyl of 1 to 4 carbon atoms, or one of the radicals $R^1$, $R^2$, and $R^3$ is unsubstituted phenyl or phenyl substituted by alkyl of 1 to 4 carbon atoms, methoxy or ethoxy, and
A denotes is a 5-membered or 6-membered saturated heterocyclic ring selected from the group consisting of piperidine, morpholine, thiomorpholine and pyrrolidine, and Y is hydroxy, alkyl of 1 to 4 carbon atoms, alkoxy of 1 to 4 carbon atoms, chlorine, bromine or alkylcarbonylamino of a total of 2 to 4 carbon atoms, n is 0, 1 or 2, $R^6$ and $R^7$ are each hydrogen, alkyl of 1 to 4 carbon atoms, cyclohexyl or unsubstituted phenyl or phenyl substituted by alkyl of 1 to 4 carbon atoms or alkoxy of 1 to 4 carbon atoms, and Z is hydrogen, hydroxy, methoxy, methoxy or hydroxysulfonyl.

2. An azo compounds as claimed in claim 1, wherein $R^1$ is o-tolyl, p-tolyl, p-methoxyphenyl, p-ethoxyphenyl or phenyl, $R^2$ and $R^3$ are methyl or ethyl, and A has the meaning given in claim 1.

3. An azo compounds of the formula:

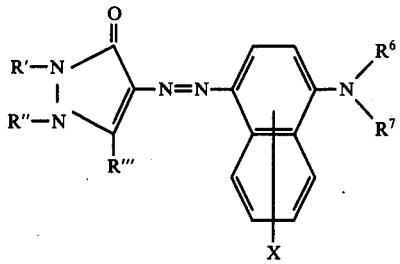

where
- R' is o-tolyl, p-tolyl, p-methoxyphenyl, p-ethoxyphenyl or phenyl,
- R" and R'" are each methyl or ethyl,
- $R^6$ is hydrogen or methyl,
- $R^7$ is hydrogen, cyclohexyl, p-tolyl, p-ethoxyphenyl or phenyl, and
- X is hydrogen, methoxy, ethoxy, hydroxy or hydroxysulfonal.

4. An azo compound of the formula:

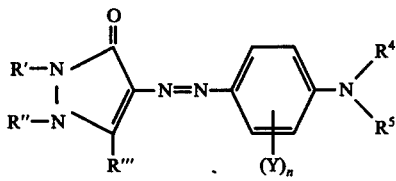

where
- R' is o-tolyl, p-tolyl, p-methoxyphenyl, p-ethoxyphenyl or phenyl, R" and R'" each are methyl or ethyl,
- $R^4$ and $R^5$ are each hydrogen; alkyl of 1 to 8 carbon atoms; hydroxyalkyl of 2 or 3 carbon atoms; alkoxyalkyl of 3 to 8 carbon atoms; cyanoethyl; alkylcarbonyloxyalkyl of a total of 4 to 10 carbon atoms; alkylcarbonyl with 1 to 3 carbon atoms in the alkyl; cyclohexyl; phenalkyl of 7 to 10 carbon atoms; or unsubstituted phenyl or phenyl substituted by alkyl of 1 to 4 carbon atoms, methoxy or ethoxy; or
- $R^4$ is N, N-dialkylaminoalkyl of a total of 4 to 11 carbon atoms or N, N-bisphenylalkylaminoalkyl having 7 to 10 carbon atoms per phenylalkyl and 2 or 3 carbon atoms in the aminoalkyl; or the group

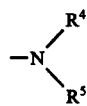

is a 5-membered or 6-membered saturated heterocyclic ring selected from the group consisting of piperidine, morpholine and pyrrolidine, and
- Y is hydroxy, alkyl of 1 to 4 carbon atoms, alkoxy of 1 to 4 carbon atoms, chlorine, bromine or alkylcarbonylamino of a total of 2 to 4 carbon atoms, and
- n is 0 to 1.

5. An azo compound as claimed in claim 4, wherein R' is phenyl and R" and R'" are each methyl.

6. An azo compounds as claimed in claim 4, wherein $R^4$ and $R^5$ are each methyl, ethyl, butyl, β-hydroxyethyl, β-acetoxyethyl or β-cyanoethyl, or $R^4$ is phenyl, benzyl, p-tolyl, p-ethoxyphenyl, β-(N,N-dimethylamino)ethyl, β-(N,N-dibenzylamino)ethyl or acetyl and $R^5$ is hydrogen, methyl or ethyl, Y is hydroxy, bromine, chlorine, acetylamino, methyl, methoxy or ethoxy, and n is 0 or 1.

7. An azo compounds as claimed in claim 5, wherein $R^4$ and $R^5$ are each methyl, ethyl, butyl, β-hydroxyethyl, β-acetoxyethyl or β-cyanoethyl, or $R^4$ is phenyl, benzyl, p-tolyl, p-ethoxyphenyl, β-(N,N-dimethylamino)ethyl, β-(N,N-dibenzylamino)ethyl or acetyl and $R^5$ is hydrogen, methyl or ethyl, K is hydroxy, bromine, chlorine, acetylamino, methyl, methoxy or ethoxy, and n is 0 or 1.

8. The azo compound of the formula:

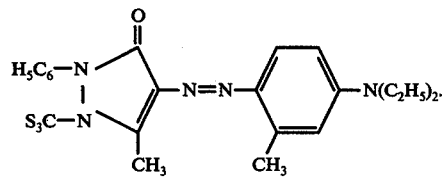

9. The azo compound of the formula:

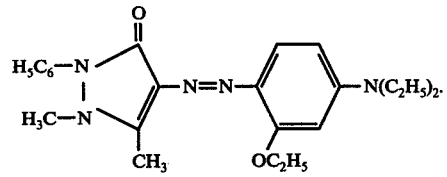

10. The azo compound of the formula:

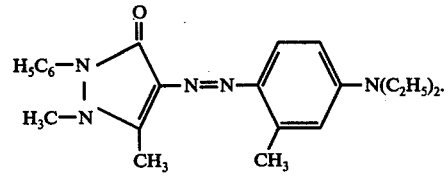

* * * * *

UNITED STATES PATENT AND TRADEMARK OFFICE
CERTIFICATE OF CORRECTION

PATENT NO. : 4,119,622
DATED : October 10, 1978
INVENTOR(S) : BAUMANN ET AL

It is certified that error appears in the above-identified patent and that said Letters Patent are hereby corrected as shown below:

In claim 2, first line, cancel "compounds" and substitute --compound--.

In claim 3, first line, cancel "compounds" and substitute --compound--.

In claim 3, last line, cancel "droxysulfonal" and substitute --droxysulfonyl--.

In claim 7, sixth line, cancel "K" and substitute --Y--.

In claim 8, in the structural formula, cancel "$S_3C-N$" and substitute --$H_3C-N$--.

UNITED STATES PATENT AND TRADEMARK OFFICE
CERTIFICATE OF CORRECTION

PATENT NO. : 4,119,622

DATED : October 10, 1978

INVENTOR(S) : BAUMANN ET AL

It is certified that error appears in the above-identified patent and that said Letters Patent are hereby corrected as shown below:

In claim 10, in the structural formula, delete

" 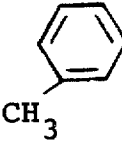 " and substitute --  --.

In claims 6 and 7, first line, cancel "compounds" and substitute --compound--.

Signed and Sealed this

*First* Day of *May 1979*

[SEAL]

Attest:

RUTH C. MASON
*Attesting Officer*

DONALD W. BANNER
*Commissioner of Patents and Trademarks*